US005391030A

United States Patent [19]

Lee

[11] Patent Number: 5,391,030

[45] Date of Patent: Feb. 21, 1995

[54] WHEELCHAIR RESTRAINT AFFIXMENT STRAPS

[76] Inventor: Ray Lee, 27082 Segovia Cir., Mission Viejo, Calif. 92691

[21] Appl. No.: 960,810

[22] Filed: Oct. 14, 1992

[51] Int. Cl.[6] .......................... B60N 2/00; B60P 7/08

[52] U.S. Cl. .......................... 410/12; 410/7; 410/23

[58] Field of Search .......................... 410/4, 7, 8, 11, 12, 410/21, 23, 97, 100, 105, 115; 280/304.1; 24/16 R, 17 AP

[56] References Cited

U.S. PATENT DOCUMENTS

| | | | |
|---|---|---|---|
| 4,111,132 | 9/1978 | Plut | 410/97 |
| 4,257,644 | 3/1981 | Stephens | 410/12 X |
| 4,427,210 | 1/1984 | Wevers | 410/23 X |
| 4,569,108 | 2/1986 | Schwab | 24/17 AP X |
| 4,688,843 | 8/1987 | Hall | 410/105 X |
| 4,966,392 | 10/1990 | Featon et al. | 280/304.1 X |
| 5,026,225 | 6/1991 | McIntyre | 410/23 |

FOREIGN PATENT DOCUMENTS

| | | | |
|---|---|---|---|
| 2452623 | 11/1980 | France | 410/12 |
| 5898 | of 1888 | United Kingdom | 24/17 AP |

*Primary Examiner*—Michael S. Huppert
*Assistant Examiner*—Stephen Gordon
*Attorney, Agent, or Firm*—Edgar W. Averill, Jr.

[57] ABSTRACT

A short wheelchair restraining strap formed from webbing is formed with a small loop at one end and a large loop at the other end. The small loop is passed around a portion of the wheelchair frame, and the large loop is then passed through the small loop. The short strap so attached then leaves the large loop end protruding from the wheelchair frame which provides an easy point of attachment for a tie-down strap. The tie-down strap is a length of webbing having two ends held to a fitting affixed to the floor of a vehicle. A length adjusting buckle is positioned in the length of webbing. The tie-down strap is looped through the large loop of the short wheelchair restraining strap.

12 Claims, 2 Drawing Sheets

10
12
D
19
16
20
18
11
15
d
14
13
29
30
31
33
32
24
27
23
25
26
28
21
22

WHEELCHAIR RESTRAINT AFFIXMENT STRAPS

BACKGROUND OF THE INVENTION

The field of the invention is wheelchair restraint systems, and the invention relates more particularly to straps used to secure a wheelchair to the floor of a motor vehicle. When wheelchairs are transported in a bus or other vehicle, it is important that the wheelchair be restrained so that when the bus starts, stops or turns, that the wheelchair will not move any significant distance.

Many restraint systems have been devised, and most of these use a floor track installed in the vehicle to which a track end fitting is snapped. The major drawback with presently used systems is that it is very time consuming for the motor vehicle operator, or assistant, to tie down the wheelchair which must be done before the bus can move. Part of the reason for this time-consuming step is the inaccessibility of the frame of the wheelchair for attachment of securement straps. Wheelchair restraint systems are shown in the following U.S. Pat. Nos. 4,060,271; 4,257,644; 4,427,210; 4,492,403; 4,623,289; 4,688,843; 4,826,193; 4,951,365; 4,966,392; and 5,026,225. Most of these tie-down restraint systems require time-consuming attachment steps. Others are impractical in that the cost of equipping vehicles with such devices is prohibitively expensive and they are not adaptable to all wheelchairs.

SUMMARY OF THE INVENTION

It is an object of the present invention to provide a strap for facilitating the attachment of tie-down restraints to a wheelchair in a motor vehicle.

The present invention is for a plurality of short straps attached to a wheelchair to facilitate the tying down of the wheelchair to a floor or other structural portion of a vehicle. Each of the short straps is made from a short length of webbing having a first terminus and a second terminus which are slightly overlapped by an amount equal to an overlapped distance. The short length of webbing is sewn into a first loop by sewing along most of the overlapped distance forming an exterior first terminus and an interior second terminus, and the sewn length is a first loop sewn length. A small loop is formed by sewing a length of the first loop together, and this sewn distance is a small loop sewn length. When the first loop is flattened to form a flattened loop, it has a smaller loop at one end, a smaller loop end and a larger loop at the other end and a larger loop end. The small loop sewn length is about the same distance from the smaller loop end as the large loop sewn length is from the larger loop end. The larger loop is encircled about a portion of the frame and passed through the smaller loop to provide an attachment loop accessible to tie-down straps. Preferably, the first loop sewn length is such that a short free, or unsewn length, is present between the first loop sewn length and the first terminus. This helps to prevent the smaller loop from slipping back over the larger loop and falling from the wheelchair. Preferably, there are four such short straps continuously attached to the wheelchair. In use, the driver or assistant can quickly pass the tie-down straps of the present invention through the larger loops which are extending a sufficient distance from the wheelchair to be readily accessible. The tie-down strap is affixed at a first end to a ring secured to the floor. It is looped through the larger loop of the strap affixed to the wheelchair. It is then affixed at the second end by an attached snap to the same ring as that first end is affixed. Tightening means are included along the tie-down strap. The short strap loops are not so large, however, as to cause any interference with the operation of the wheelchair and they typically remain permanently affixed to the wheelchair.

DESCRIPTION OF THE PREFERRED EMBODIMENTS

Figures 1, 2, 3:
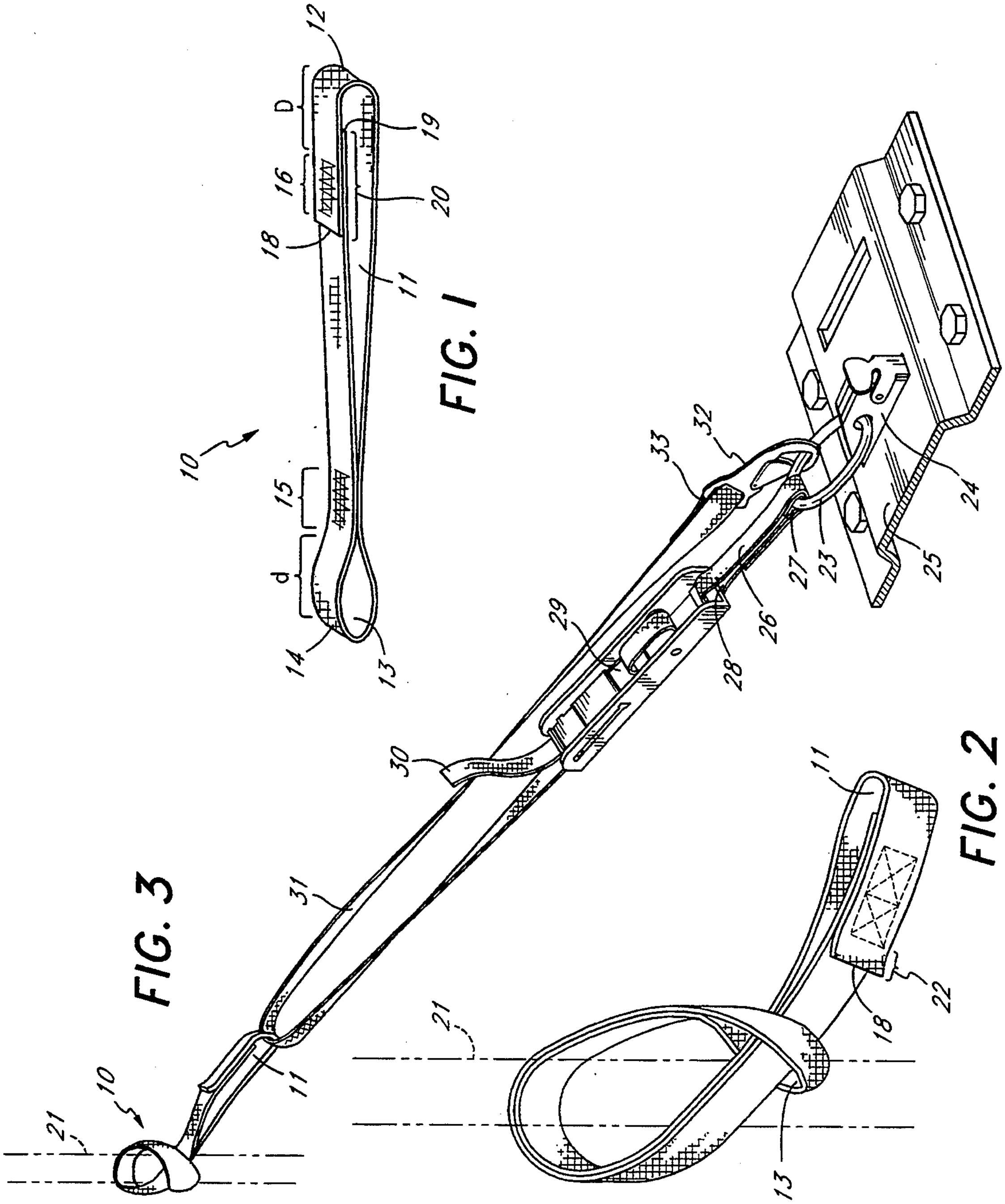
FIG. 1 is a perspective view of one of the short straps of the present invention.
FIG. 2 is a perspective view of the short strap of FIG. 1 formed into a loop encircling a portion of the frame of a wheelchair.
FIG. 3 is a perspective view of the short strap of FIG. 1 encircling a portion of a wheelchair frame and attached to a tie-down strap for securement to the floor track of a vehicle.

A length of webbing has been formed into a short strap shown in FIG. 1. The short strap is indicated by reference character 10. The short strap has a larger loop 11 at the larger loop end 12 and a smaller loop 13 at the smaller loop end 14. A smaller loop sewn length 15 forms smaller loop 13, and a large loop sewn length 16 forms the larger loop 11. The length of webbing has an exterior first terminus 18 and an interior second terminus 19. These termini are overlapped an overlapped distance 20, and the large loop sewn length is spaced a distance "D" from the larger loop end 12. The small loop sewn length 15 is at a distance "d" from the smaller loop end 14.

The short strap of FIG. 1 is formed into a pair of loops by wrapping the larger loop end about a length of wheelchair frame 21, and the larger loop is passed through the smaller loop 13 as shown in FIG. 2. It is then pulled tight as shown in FIG. 3 and is permanently attached (although removable) to the wheelchair frame. The larger loop 11 forms an attachment loop as shown in FIG. 3 which is easily accessible to the driver. As shown best in FIG. 2, the large loop sewn length 16 is spaced at a short distance from the first terminus 18, which distance is indicated by reference character 22. This causes the first terminus 18 to be slightly separated from the exterior of the short strap so that when the smaller loop 13 moves downwardly, it is restrained by this extending terminus 18. In this way, the short straps tend to remain affixed about the wheelchair frame while at the same time being capable of being removed by merely pushing against the end 18 and slipping it through the smaller loop 13.

The tie-down strap of FIG. 3 is formed from a longer length of webbing 31 and a shorter length of webbing 26 which is looped about a ring 23 affixed to a track end fitting 24 which, in turn, is secured to a floor track 25 of a conventional design which is bolted to the vehicle floor. The shorter length of webbing 26 has a lower loop 27 sewn over ring 23. Note in FIG. 3 that the webbing is doubled at 27 to provide a cushioning flap. An upper loop 28 is secured to one end of a length-adjusting tensioning buckle 29. Buckle 29 grasps the free end 30 of the long length of webbing 31 which has been passed through larger loop 11. Alternatively, the long length of webbing may be passed around the wheelchair frame member 21. A snap hook 32 is secured by a loop 33 at the other end of webbing 31. Thus, to secure one corner, of the wheelchair, snap hook 32 is simply passed through larger loop 11 (or around frame member 21), and snapped onto ring 23. The buckle 29 can then be tightened if necessary.

Figure 4:
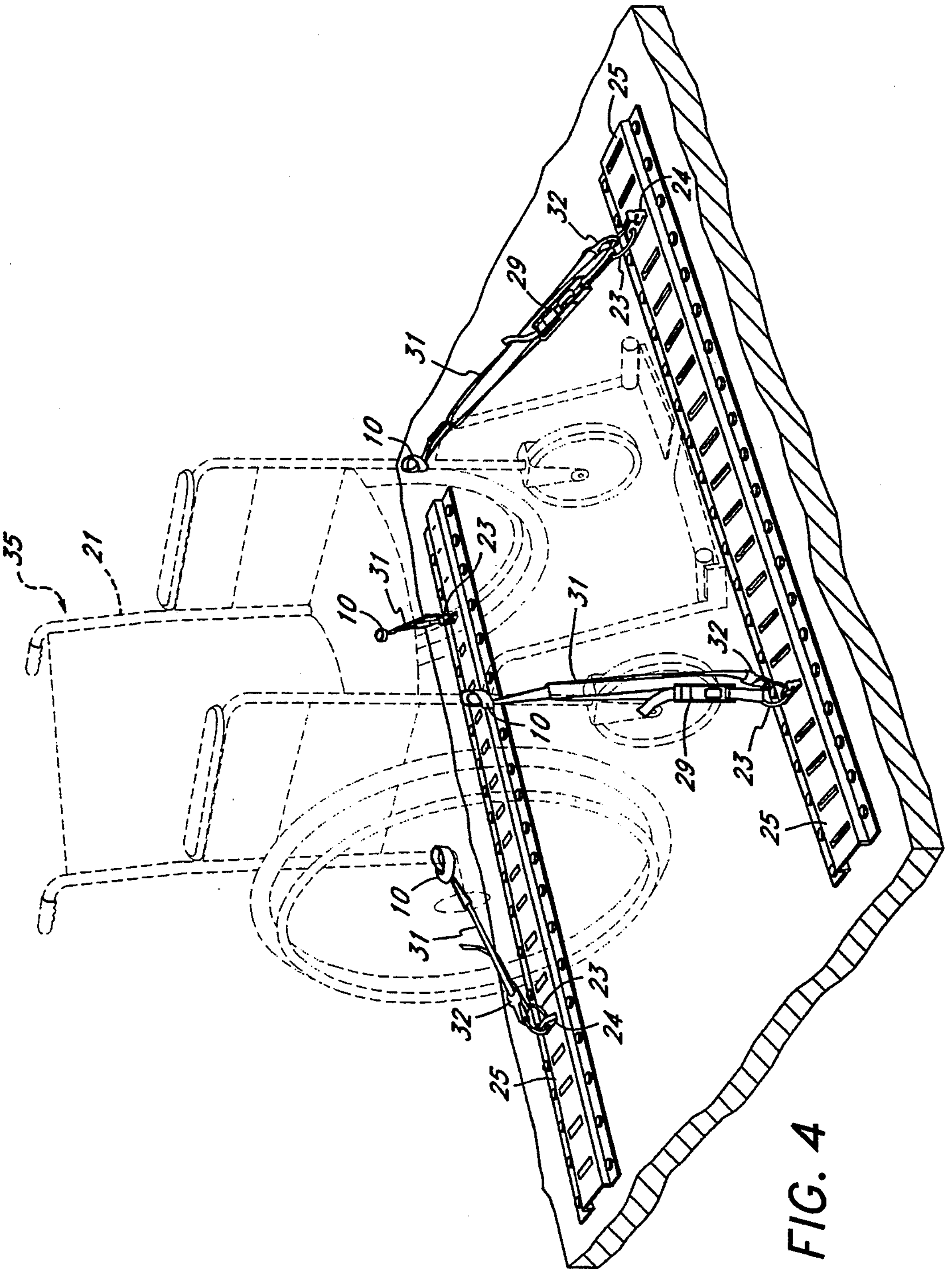
FIG. 4 is a perspective view of a wheelchair secured to the floor of a vehicle and including four of the short straps of FIG. 1 and four of the tie-down straps of FIG. 3.

As shown in FIG. 4, four short straps 10 are secured to four corners of the frame 21 of wheelchair 35. The snap hooks 32 of the tie-down strap of FIG. 3 are inserted, in turn, through all four of the short straps 10 in a manner analogous to that shown in FIG. 3.

The short straps and tie-down straps of the present invention are adaptable to all types of wheelchairs and are easily attached and may be of a distinctive color to be easily spotted by the person tying down the wheelchair. The terminus 18 of short strap 10, and preferably the second terminus 19, is preferably heat sealed so that it will not fray. This also provides a smooth catch for the small loop as described above.

The short straps also provide additional shock absorption for reduction of impact on the metal of the wheelchair. High strength synthetic fibers such as nylon or polyester may be used for the webbing and (particularly with nylon) this provides a certain amount of give so that the frame of the wheelchair is not unduly stressed.

Preferably, when using one inch wide, 1/16th inch thick webbing, the short strap has an overall length of 24 inches, and the distance "d" is about one and one-half inches. Because the short straps are soft, they tend to spread out the load on the wheelchair frame and do not tend to dent or distort the frame.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A plurality of short straps affixed to a wheelchair to facilitate the tying down of a wheelchair to a floor or other structural portion of a vehicle for the purpose of restraining the wheelchair during starting and stopping of said vehicle, said plurality of short straps being affixed to the wheelchair frame, each of said short straps comprising:

- a length of webbing having a first terminus and a second terminus which are overlapped by an amount equal to an overlapped distance, said length of webbing being sewn into a first loop by sewing along a sewn length along most of the overlapped distance thereby forming an exterior first terminus and an interior second terminus, and said sewn length being a first loop sewn length;
- a smaller loop formed by sewing a length of the first loop together along a sewn distance and this sewn distance being a small loop sewn length and positioned so that as the first loop is flattened to form a flattened loop having the smaller loop at one end, and a larger loop at another end, the flattened loop comprising a smaller loop end and a larger loop end, the small loop sewn length is about the same distance from the smaller loop end as the first mentioned sewn length is from the larger loop end; and
- said larger loop end being capable of being encircled about a portion of the frame of the wheelchair and extended through the smaller loop to provide an attachment loop accessible to tie-down straps.

2. The apparatus of claim 1 wherein said exterior first terminus has a short free unsewn length adjacent thereto for catching the smaller loop on the short free unsewn length and retaining the respective short strap over the wheelchair frame.

3. The apparatus of claim 1 wherein there are four straps encircled about four different portions of the frame of the wheelchair.

4. The apparatus of claim 1 wherein the first terminus and the second terminus are heat sealed.

5. The apparatus of claim 1 wherein the length of webbing of each strap is about twenty-four inches.

6. The apparatus of claim 1 wherein the distance of the small loop sewn length from the smaller loop end is about one and one-half inch.

7. A wheelchair tie-down strap system for securing a wheelchair to a vehicle, said system comprising a tie-down strap, said tie-down strap comprising

- a length-adjusting buckle affixed at one end to ring means securable to the vehicle;
- a long length of webbing including a first end held by said length-adjusting buckle;
- a second end of the long length of webbing secured to the frame of a wheelchair by being passed through securement means secured to the frame; and
- a snap hook affixed to the second end of the long length of webbing, said snap hook being snapped to the ring means.

8. The wheelchair tie down strap system of claim 7 wherein said length-adjusting buckle is affixed to said ring means by a loop of webbing.

9. The wheelchair tie down strap system of claim 7 further including securement means, wherein said securement means is a small double loop and is configured such that one of its loops may be passed around the wheelchair frame with the other of its loops extending outwardly such that said second end of said long length of webbing may be passed through said other loop.

10. The wheelchair tie down strap system of claim 7 wherein there are four of said tie-down straps.

11. The wheelchair tie down strap system of claim 7 wherein said ring means comprises a ring held to a track end fitting which is connected to a floor track.

12. A process for providing a tie down attachment point to a wheelchair comprising the steps of:

- grasping a loop of webbing, which is sewn together in the middle and has a smaller loop at one end and a larger loop at the other end;
- passing the loop of webbing over a wheelchair frame member so that the smaller loop is on one side of the wheelchair frame member and the larger loop is on the other side of the wheelchair frame member; and
- passing the smaller loop through the larger loop, thereby providing an extending smaller loop to provide a tie down attachment point.

* * * * *